United States Patent [19]

Oyamada

[11] Patent Number: 4,881,150
[45] Date of Patent: Nov. 14, 1989

[54] HOUSING AND HOLDER ASSEMBLY FOR A PORTABLE COMMUNICATION APPARATUS

[75] Inventor: Takashi Oyamada, Tokyo, Japan

[73] Assignee: NEC Corporation, Tokyo, Japan

[21] Appl. No.: 217,493

[22] Filed: Jul. 11, 1988

[30] Foreign Application Priority Data

Jul. 10, 1987 [JP] Japan .............................. 62-105208[U]

[51] Int. Cl.⁴ .............................................. H05K 7/00
[52] U.S. Cl. ...................................... 361/392; 24/3 J
[58] Field of Search ................ 24/3 F, 3 G, 3 H, 3 J; 361/427, 392

[56] References Cited

U.S. PATENT DOCUMENTS 4,741,074 5/1988 Budano et al. ......................... 24/3 J Primary Examiner—Roy N. Envall, Jr.
Attorney, Agent, or Firm—Sughrue, Mion, Zinn, Macpeak & Seas

[57] ABSTRACT

A housing and holder assembly applicable to, for example, a radio pager or similar portable communication apparatus includes a battery cover which is attached to the bottom of a housing of the apparatus and slidable into and out of engagement with the housing. A holder is removably mounted on the back of the housing while a clip is provided on the holder. The apparatus may be put on a person's waist belt or the like through the clip. Even when the housing and the holder are locked to each other, the battery cover may be slid to be removed from the housing.

7 Claims, 5 Drawing Sheets

Fig. 5
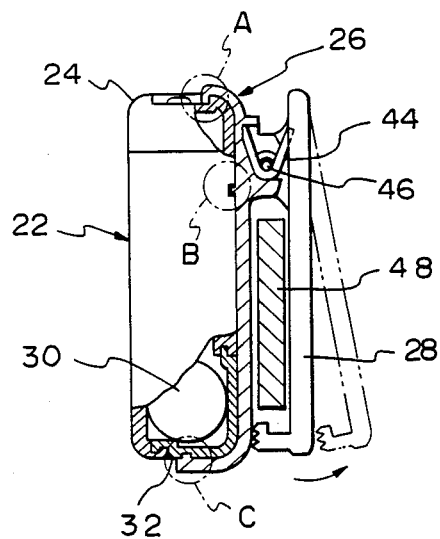
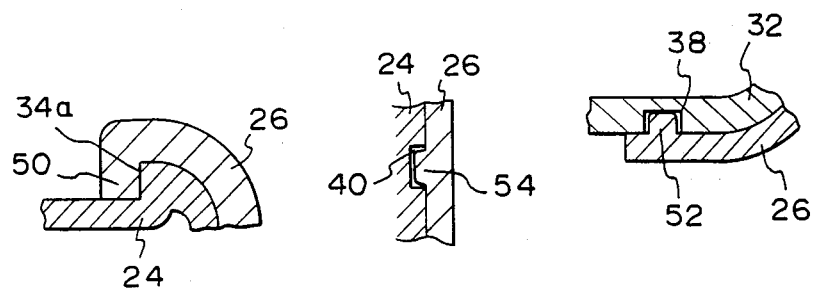
Fig. 6A  Fig. 6B  Fig. 6C

HOUSING AND HOLDER ASSEMBLY FOR A PORTABLE COMMUNICATION APPARATUS

BACKGROUND OF THE INVENTION

The present invention relates to a housing and holder assembly applicable to any of various kinds of portable electrical apparatuses such as a radio pager or similar portable communication apparatus.

An apparatus of the kind described is in many cases put on a person's waist belt or in a breast pocket through a holder which is provided on a housing of the apparatus. The holder is customarily implemented by a butterfly clip which is securely connected to the housing to be opened and closed as needed or an independent portable holder in which the apparatus may be bodily received. On the other hand, there is an increasing demand for a clip which is removable from the apparatus housing depending upon the application, and a removable clip which meets such a demand is predominant in the market. However, the prior art holders are difficult to attach and detach and therefore apt to be scratched or even seriously damaged. Further, they are bulky and therefore poor in portability, expensive, and not attractive in appearance.

SUMMARY OF THE INVENTION

It is therefore an object of the present invention to provide a housing and holder assembly for a radio pager or like portable communication apparatus which promotes easy attachment and detachment of a holder from a housing, enhances portability and attractive appearance, and eliminate the fear of damage during attachment and detachment.

A housing and holder assembly for a portable communication apparatus of the present invention comprises a housing accommodating the apparatus, a battery cover forming a part of the housing and slidable relative to the housing into and out of engagement with the housing, the battery cover closing a bore which is defined in the housing for receiving a battery which powers the apparatus, a holder removably mounted on the housing and, when mounted on the housing, engaging both of the housing and the battery cover, and a locking device for, when the holder is mounted on the housing, locking the holder in position such that the battery cover is removable from the housing with the holder being held in engagement with the housing.

BRIEF DESCRIPTION OF THE DRAWINGS

The above and other objects, features and advantages of the present invention will become more apparent from the following detailed description taken with the accompanying drawings in which:

FIG. 5 is a partly sectional side elevation of the housing and holder assembly as shown in FIG. 4;

FIG. 6A is an enlarged view of a portion A which is shown in FIG. 5;

FIG. 6B is an enlarged view of a portion B which is also shown in FIG. 5;

FIG. 6C is an enlarged view of a portion C which is also shown in FIG. 5; and

DESCRIPTION OF THE PREFERRED EMBODIMENT

To better understand the present invention, a brief reference will be made to prior art holders which are applicable to a radio pager.

Figure 1:
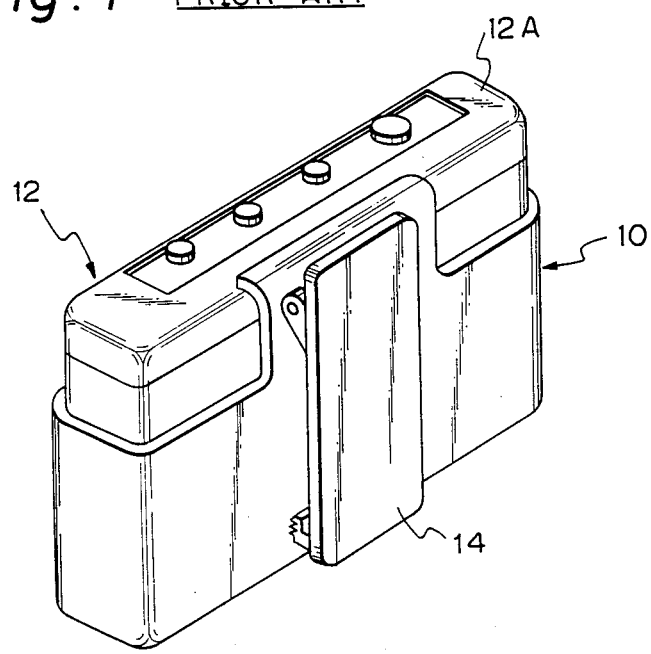
FIGS. 1, 2, 3A and 3B are views showing examples of a prior art housing and a prior art holder which are used with a radio pager.
Figure 2:
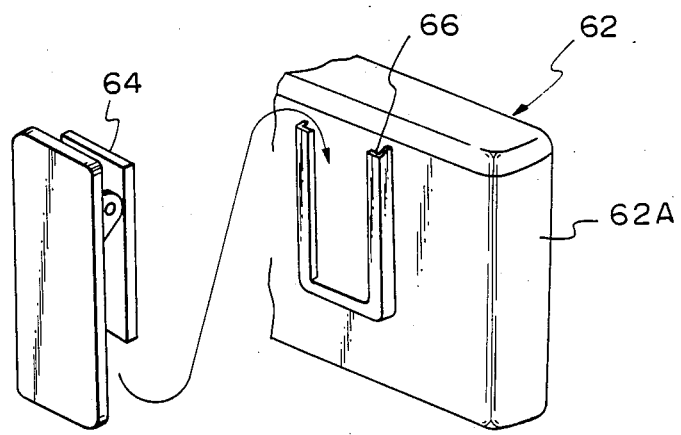
Figure 3A:
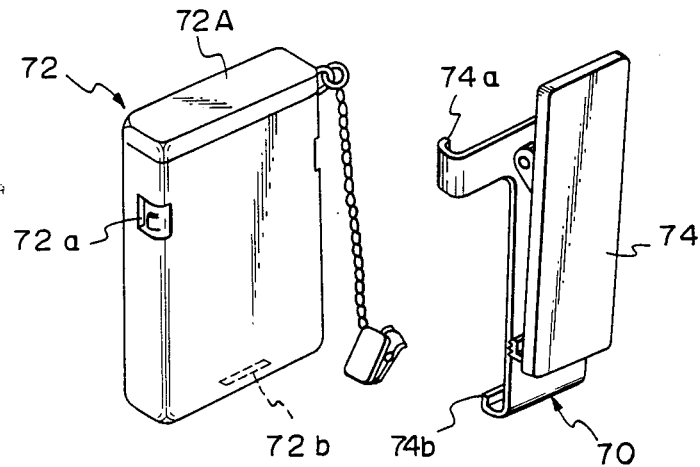

Referring to FIG. 1, a prior art holder 10 has a generally holster-like configuration and accommodates a body 12A of a radio pager 12 therein. The holder 10 is usually formed from plastic. A clip 14 is securely mounted on the back of the holder 10 and not directly mounted on the pager body 12A. FIG. 2 shows another prior art implementation in which an independent clip 64 is slidably engaged with rails 66 that are provided on the back of a body 62A of a radio pager 62. The clip 14 shown in FIG. 2 is removable from the pager body 62A as desired. FIG. 3A shows a further prior art implementation in which a holder 70 is provided with a clip 74 thereon and removable from a body 72A of a radio pager 72. The holder 70 of FIG. 3A is comprised of a molding of plastic and includes a plurality of projections 74a and 74b. To attach the holder 70 of FIG. 3A to the pager body 72A, the projections 74a and 74b are respectively mated with recesses 72a and 72b which are provided at side portions and a bottom portion of the pager body 72A. The holder 70 of FIG. 3A may be removed from the pager body 72A by forcibly deforming the projection 74a away from the pager body 72A.

Figure 3B:
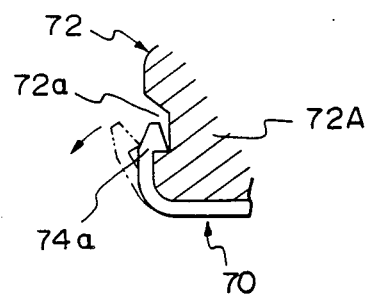
Figure 4:
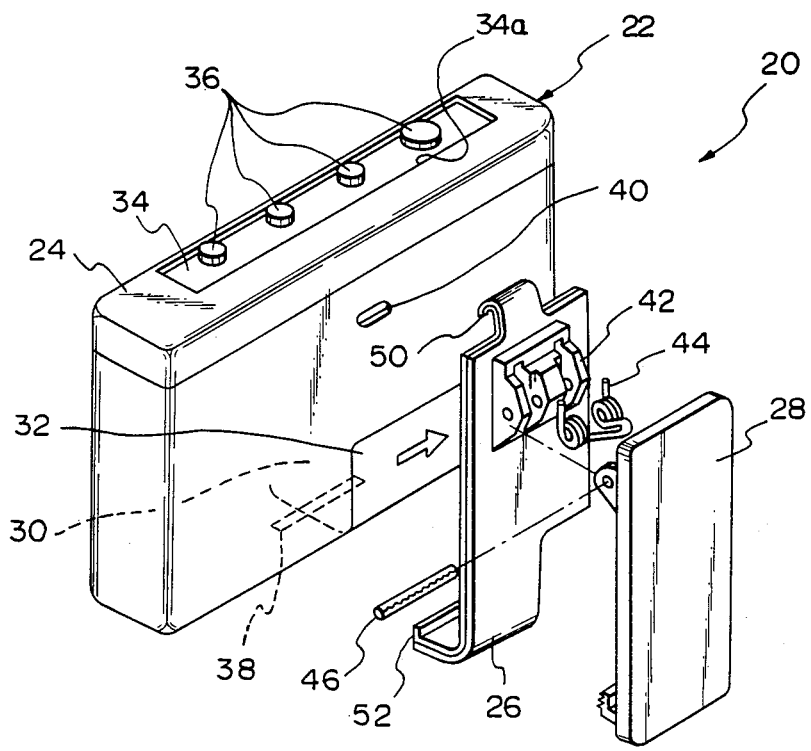
FIG. 4 is an exploded perspective view of a housing and holder assembly in accordance with the present invention.

The holster-like holder 10 shown in FIG. 1 suffers from a drawback that although the pager body 12A itself may be small size, the holder 10 adapted to accommodate the pager body 12A is larger than the pager body 12A. Eventually, the whole radio pager 12 is bulky and poor in portability. In addition, this kind of holder 10 is usually produced on option basis and therefore more expensive than ordinary clips. The implementation shown in FIG. 2 allows the clip 64 to be directly mounted on the pager body 62A without substantially increasing the overall dimensions of the pager 62. However, when the clip 64 is removed from the pager body 62A, the rails 66 on the pager body 62A show themselves to impair the appearance of the pager 62 and are apt to allow dust and other impurities thereinto. The implementation shown in FIGS. 3A and 3B is advantageous over that of FIG. 2 in that the rails 66 are absent on the pager body 72A even when the holder 70 is removed from the pager body 72A. Nevertheless, the holder 70 of FIGS. 3A and 3B cannot be removed from the pager body 72A without being forcibly deformed by means of tweezers or the like, as stated earlier with reference to FIG. 3B. This is apt to scratch the pager body 72A and even break the flat holder 70.

Referring to FIGS. 4, 5, 6A to 6C, 7A and 7B, a housing and holder assembly in accordance with the present invention is shown and generally designated by the reference numeral 20. In the illustrative embodiment, the housing and holder assembly 20 is applied to a radio pager by way of example. As shown, the housing and holder assembly 20 is generally made up of a housing 24 of a radio pager 22, a holder 26 removably mounted on the housing 24, and a clip 28 mounted on the holder 26. A battery (not shown) for powering the pager 22 is recieved in a bore 30 which is defined in a side bottom portion of the housing 24. A battery cover 32 is provided for closing the bore 30 and slidable laterally, i.e., in a direction indicated by an arrow in FIG. 4 into and out of engagement with the housing 24. Provided atop the housing 24 is an operating section 34 of the pager 22. Buttons 36 each being accessible for a particular operation are arranged in the operating section 34. The operating section 34 is configured into a shallow recess to eliminate erroneous operations. A single first channel 38 extends throughout a part of the bottom of the housing 24 and a part of the battery cover 32 and in parallel to the sliding direction of the battyer cover 32. A second channel 40 is provided in an intermediate portion of the back of the housing 24.

Made of plastic, the holder 26 is produced by forming to have a profile which is generally complementary to that part of the housing 24 which includes a top corner portion, back and bottom. A seat 42 is provided on the back of the holder 26. The clip 28 is mounted to the seat 42 through a spring 44 and a spring pin 46. In this configuration, the clip 28 is rotatable about the spring pin 46 in a butterfly motion to promote easy attachment of the holder 26 to a person's waist belt 48 (FIG. 5). Projections 50 and 52 respectively extend from the upper and lower ends of the holder 26 toward the housing 24. When the holder 26 is attached to the housing 24, the projections 50 and 52 are respectively elastically engaged with a shoulder 34a which is defined in the operating section 34 of the housing 24 and the first channel 38. A lug 54 (FIG. 6B) extends from an intermediate portion of the front of the holder 26, i.e., a position where it faces the second channel 40. This lug 54 serves to prevent the holder 26 from being dislocated when mated with the second channel 40.

As shown in FIGS. 5 and 6A to 6C, when the holder 26 is sequentially rotated with its upper projection 50 being engaged with the shoulder 34a of the operating section 34, the lower projection 52 of the holder 26 is caused to mate with the first channel 38 due to the elasticity of plastic. In this position, the holder 26 and the housing 24 firmly retain each other. The lug 54 of the holder 26 is mated with the second channel 40 of the housing 24 to restrain the holder 26 from lateral dislocation. If desired, the holder 26 may be mounted to the housing 24 by hooking the lower projection 52 to the first channel 38 and then rotating the holder 26 until the upper projection 50 engages the shoulder 34a.

Figure 7A:
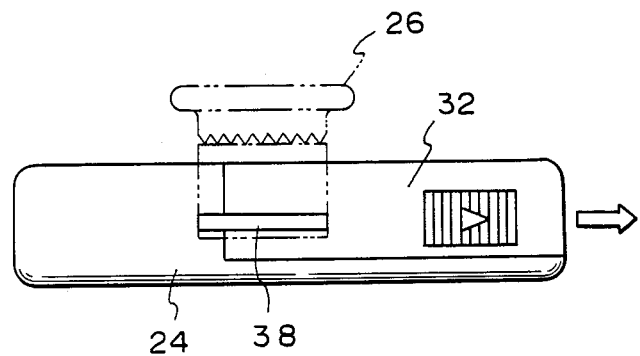
FIGS. 7A and 7B are bottom views schematically showing how a holder of the housing and holder assembly of the present invention may be attached and detached.
Figure 7B:
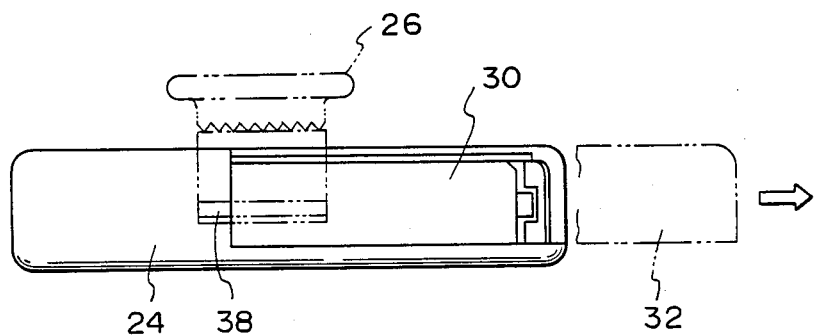

To remove the holder 26 from the housing 24, the battery cover 32 is slid laterally out of the housing 24, as shown in FIGS. 7A and 7B. As the lower projection 52 of the holder 26 is released from that part of the first channel 38 which is provided on the battery cover 32, that part of the projection 52 which faces the bore or battery chamber 30 may be pushed upward by finger. In this manner, when the battery cover 32 is removed from the housing 24, the holder 26 can be dismounted from the housing 24 simply by touching the projection 52. Since such an operation is effected by finger, the housing 24 and holder 26 are protected against scratches. The fact that the projection 52 is partly left in the other part of the first channel 38 which is provided on the housing 24 when the battery cover 32 is removed is effective in preventing the holder 26 from being entirely separated from the housing 24 when the battery cover 32 is removed.

Preferably, the bore 30 of the housing 24 is dimensioned such that a battery can be replaced simply by removing the battery cover 32. This would eliminate the need for removing the holder 26 every time a battery should be replaced. After the replacement of a battery, the battery cover 32 is again slid into engagement with the housing 24 resulting in the holder 26 being firmly attached to the housing 24.

When the holder 26 is put on the waist belt 48 or the like, it is hardly visible from the outside because it is mounted only on the substantially intermediate portion of the back of the pager 22, i.e., the pager 22 does not seem bulky at all despite the presence of the holder 26. The holder 26 which is implemented by a single molding of plastic is inexpensive. When the holder 26 is not used with the housing 24, projections and recesses which would impair the appearance are absent on the housing 24. The surface of the housing 24 may be finished by contraction to make the channels 38 and 40 on the bottom and back of the housing 24 unnoticeable. The channel 40 on the back would successfully function even with relatively small dimensions. The channel 38 on the bottom is not objectionable because the bottom is hardly visible.

In summary, it will be seen that the present invention provides a housing and holder assembly for a portable communication apparatus which has desirable portability and attractive design with no regard to an optional holder and allows the holder to be attached and detached as desired without the fear of scratches and serious damage.

Various modifications will become possible for those skilled in the art after receiving the teachings of the present disclosure without departing from the scope thereof. For example, the configurations of the housing and holder shown and described are only illustrative and may be replaced with other suitable configurations.

What is claimed is:

1. A housing and holder assembly for a portable communications apparatus, comprising:
    a housing accommodating said apparatus;
    a battery cover forming a part of said housing and slidable relative to said housing into and out of engagement with said housing, said battery cover closing a bore which is defined in said housing for receiving a battery which powers said apparatus;
    a holder removably mounted on said housing and, when mounted on said housing, engaging said housing in at least two places such that at one of said at least two places the holder contacts both said housing and said battery cover simultaneously; and
    locking means associated with said one of said at least two places for, when said holder is mounted on said housing, locking said holder in position such that said battery cover is removable from said housing with the holder being held in engagement with said housing, removal of said battery cover facilitating detachment of said holder from said housing.

2. A housing and holder assembly as claimed in claim 1, wherein said housing comprises at least a top on which an operating section of said apparatus is provided, a bottom where said battery cover is positioned, and a back on which said holder is removably mounted.

3. A housing and holder assembly as claimed in claim 2, wherein said locking means comprises a channel extending throughout a part of the bottom of said housing and a part of said battery cover, and a projection provided in that part of said holder which corresponds to the bottom of said housing and said battery cover, and engageable with said channel.

4. A housing and holder assembly as claimed in claim 3, wherein the top of said housing is shaped in a recess which defines said operating section of said apparatus.

5. A housing and holder assembly as claimed in claim 4, where said locking means further comprises a shoulder which forms a wall of said recess, and a projection protruding from that part of said holder which corresponds to the top of said housing and engageable with said shoulder.

6. A housing and holder assembly as claimed in claim 2, further comprising positioning means for positioning said holder on the back of said housing.

7. A housing and holder assembly as claimed in claim 6, wherein said positioning means comprises a channel provided on the back of said housing, and a lug extending from that part of said holder which corresponds to the back of said housing and engageable with said channel.

* * * * *